(12) United States Patent
Lee et al.

(10) Patent No.: US 9,799,912 B2
(45) Date of Patent: Oct. 24, 2017

(54) RECHARGEABLE BATTERY HAVING COVER

(71) Applicant: SAMSUNG SDI CO., LTD., Yongin-si, Gyeonggi-do (KR)

(72) Inventors: Hyun-Soo Lee, Yongin-si (KR); Jeong-Won Oh, Yongin-si (KR); Sang-Shin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 87 days.

(21) Appl. No.: 14/875,606

(22) Filed: Oct. 5, 2015

(65) Prior Publication Data
US 2016/0260997 A1 Sep. 8, 2016

(30) Foreign Application Priority Data
Mar. 3, 2015 (KR) ........................ 10-2015-0030014

(51) Int. Cl.
*H01M 10/04* (2006.01)
*H01M 2/02* (2006.01)
(Continued)

(52) U.S. Cl.
CPC ....... *H01M 10/0431* (2013.01); *H01M 2/027* (2013.01); *H01M 2/0237* (2013.01);
(Continued)

(58) Field of Classification Search
CPC .......... H01M 10/0431; H01M 2/0426; H01M 2/0262; H01M 2/027; H01M 2/0285;
(Continued)

(56) References Cited

U.S. PATENT DOCUMENTS

| 2003/0148177 A1* | 8/2003 | Wang ................. | H01M 2/0212 |
| | | | 429/162 |
| 2004/0180260 A1* | 9/2004 | Somatomo .......... | H01M 2/0426 |
| | | | 429/174 |

(Continued)

FOREIGN PATENT DOCUMENTS

| EP | 1271670 A1 | 1/2003 |
| EP | 2299511 A1 | 3/2011 |

(Continued)

OTHER PUBLICATIONS

Korean Patent Abstracts of Korean Publication No. 10-2003-0053092 A, Jun. 28, 2003 Corresponding to Korean Patent No. 10-0435038 B1, Jun. 9, 2004, 1 page.

(Continued)

*Primary Examiner* — Stewart Fraser
(74) *Attorney, Agent, or Firm* — Lewis Roca Rothgerber Christie LLP

(57) ABSTRACT

Embodiments of the present invention provide a rechargeable battery including an electrode assembly including a first electrode and a second electrode. The electrode assembly is spirally-wound. The rechargeable battery also include a case has an opening into which the electrode assembly is inserted, a cover coupled to the case at the opening, and a terminal electrically connected to the second electrode. The terminal extends to the outside of the case. The electrode assembly includes two side surfaces facing opposite directions and two curved surfaces that connect the two side surfaces. A surface of the cover faces a first side surface of the two side surfaces.

13 Claims, 9 Drawing Sheets

(51) Int. Cl.
*H01M 2/04* (2006.01)
*H01M 10/0587* (2010.01)

(52) U.S. Cl.
CPC ....... *H01M 2/0262* (2013.01); *H01M 2/0285* (2013.01); *H01M 2/0426* (2013.01); *H01M 2/0439* (2013.01); *H01M 2/0473* (2013.01); *H01M 2/0486* (2013.01); *H01M 10/0587* (2013.01); *H01M 2002/0297* (2013.01)

(58) Field of Classification Search
CPC ............. H01M 2/0237; H01M 2/0439; H01M 2/0473; H01M 2/0486; H01M 10/0587; H01M 2002/0297
See application file for complete search history.

(56) References Cited

U.S. PATENT DOCUMENTS

| | | | |
|---|---|---|---|
| 2007/0059594 A1 | 3/2007 | Jeon et al. | |
| 2009/0317713 A1* | 12/2009 | Kim | H01M 4/0404 429/164 |
| 2011/0311862 A1* | 12/2011 | Ahn | H01M 2/021 429/179 |
| 2012/0214051 A1 | 8/2012 | Tsukuda et al. | |
| 2012/0258352 A1* | 10/2012 | Hong | H01M 2/0217 429/163 |
| 2013/0273411 A1 | 10/2013 | Kim | |
| 2013/0316204 A1* | 11/2013 | Kim | H01M 10/0431 429/94 |
| 2015/0044547 A1* | 2/2015 | Lee | H01M 2/0287 429/186 |
| 2015/0118546 A1 | 4/2015 | Nakayama et al. | |
| 2016/0218347 A1* | 7/2016 | Baek | H01M 2/348 |

FOREIGN PATENT DOCUMENTS

| | | |
|---|---|---|
| JP | 2014-10937 A | 1/2014 |
| KR | 10-0435038 B1 | 6/2004 |
| KR | 10-2005-0028722 A | 3/2005 |
| WO | WO 2013/124992 A1 | 8/2013 |

OTHER PUBLICATIONS

EPO Extended Search Report dated Jun. 20, 2016, for corresponding European Patent Application No. 15196983.9 (7 pages).

* cited by examiner

RECHARGEABLE BATTERY HAVING COVER

CROSS-REFERENCE TO RELATED APPLICATION

This application claims priority to and the benefit of Korean Patent Application No. 10-2015-0030014 filed in the Korean Intellectual Property Office on Mar. 3, 2015, the entire content of which is incorporated herein by reference.

BACKGROUND

1. Field

Aspects of the present invention relate to a rechargeable battery. More particularly, aspects of the present invention relate to a rechargeable battery having a cover.

2. Description of the Related Art

A rechargeable battery can be repeatedly charged and discharged, unlike a primary battery that is not designed to be recharged. A rechargeable battery having a small capacity is used for a small portable electronic device like a mobile phone, a laptop computer or a camcorder, and a rechargeable battery having a large capacity is widely used as a power source for driving a motor of a hybrid vehicle.

Nowadays, a high power rechargeable battery using a non-aqueous electrolyte with high energy density has been developed, and in order to use it when driving a motor of a device, for example, an electric vehicle requiring high power, the high power rechargeable battery is formed as a rechargeable battery of a large capacity by coupling a plurality of rechargeable batteries in series.

Further, a large capacity rechargeable battery is formed with a plurality of rechargeable batteries that are generally coupled in series, and the rechargeable battery may be formed in a cylindrical shape or a rectangular shape.

The rechargeable battery includes an electrode assembly that performs charge and discharge operations, and a case that receives the electrode assembly. The case is generally produced by deep drawing, and when the case is produced by deep drawing, there is a problem that many defects may occur and a thickness of the case may increase.

The above information disclosed in this Background section is only to enhance understanding of the background of the invention and therefore it may contain information that does not form prior art.

SUMMARY

One or more embodiments of the present invention are directed toward a rechargeable battery having an easily manufactured case and facilitating easy insertion of an electrode assembly into the case.

An exemplary embodiment of the present invention provides a rechargeable battery including: an electrode assembly including a first electrode and a second electrode, wherein the electrode assembly is spirally-wound; a case that has an opening into which the electrode assembly is inserted; a cover coupled to the case at the opening; and a terminal electrically connected to the second electrode, the terminal extending to the outside of the case, wherein the electrode assembly includes two side surfaces facing opposite directions and two curved surfaces that connect the side surfaces, and the cover faces a first side surface of the two side surfaces.

The case may include a bottom plate and four sides that extend from the bottom plate, the bottom plate may be parallel to a second side surface of the two side surfaces of the electrode assembly, and the cover may be parallel to the first side surface of the electrode assembly.

The electrode assembly may further include two side ends including a first electrode uncoated region and a second electrode uncoated region in which an active material is not coated, and wherein, at the bottom plate of the case, the case may include a support jaw welded to the first electrode uncoated region.

The bottom plate may have a quadrangular shape and the four sides of the case may include a first side, a second side, a third side, and a fourth side that each extend from the bottom plate, wherein the first side and the second side may respectively face the two curved surfaces of the electrode assembly, the third side may face the first electrode uncoated region, and the fourth side may face the second electrode uncoated region.

The support jaw may be formed by bending the case and the support jaw may contact the bottom plate and the third side of the case. The case may include a groove at the support jaw.

The cover may include a flange bent parallel to a side of the case at a side end of the cover, an end portion of the flange and a side end portion of the case may be welded together, and the flange may be connected along the side end of the cover.

The cover may include a support groove bent from the flange and connected to the flange, a welding groove into which a side end portion of the case is inserted, and the cover may be welded to the case with the side end portion of the case inserted into the welding groove.

A thickness of the case may be 0.5 times to 0.8 times that of the cover.

According to an exemplary embodiment of the present invention, because the cover coupled to the case is faces the side surface of the electrode assembly, a gap between an opening and a bottom plate of the case is reduced and thus the case can be easily produced. Further, by pressing the side surface of a spirally-wound electrode assembly with the cover, a gap between electrodes can be reduced.

BRIEF DESCRIPTION OF THE DRAWINGS

These and/or other aspects of the embodiments will become apparent and more readily appreciated from the following description, taken in conjunction with the accompanying drawings.

DETAILED DESCRIPTION

Figure 1:
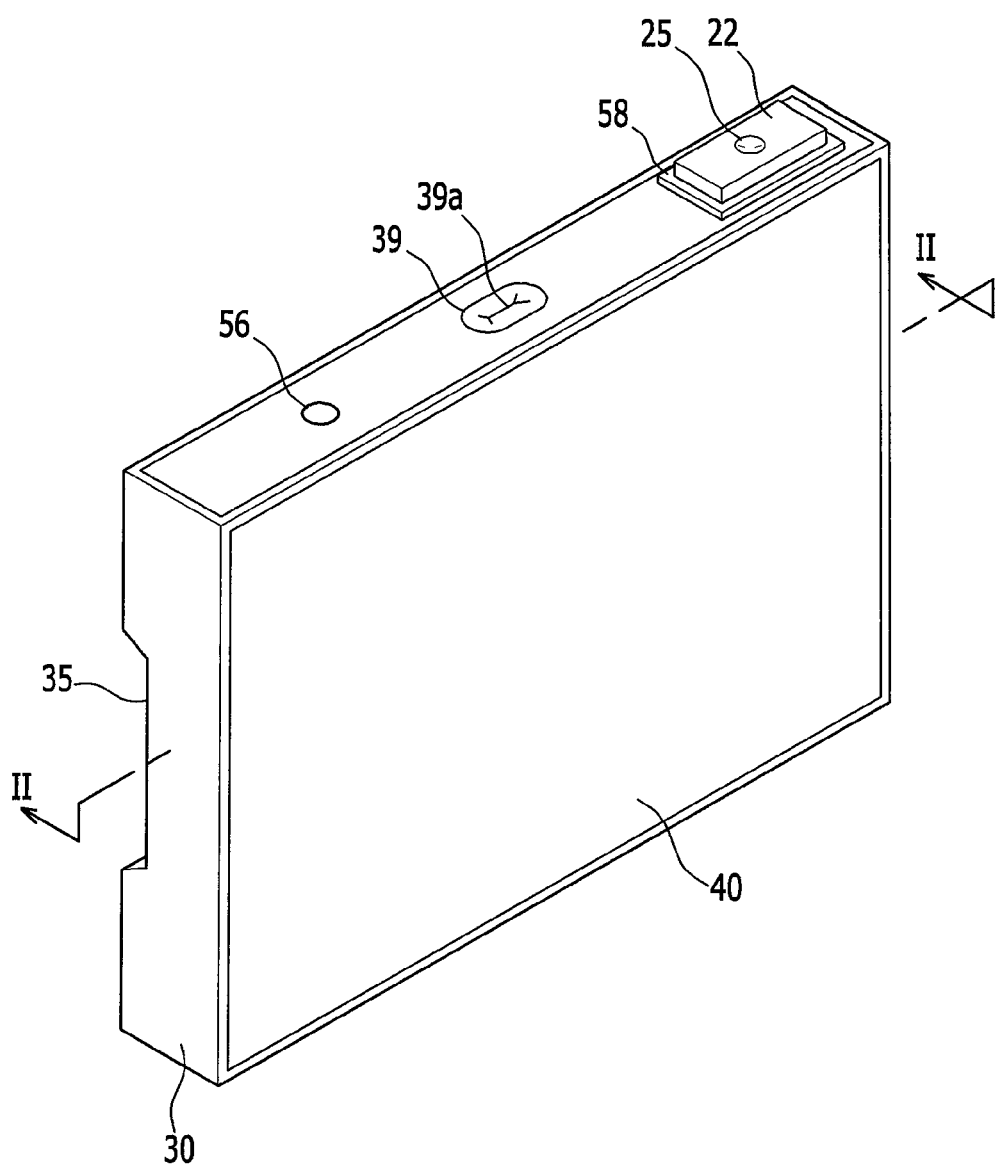
FIG. 1 is a perspective view illustrating a rechargeable battery according to a first exemplary embodiment of the present invention.

Hereinafter, exemplary embodiments of the present invention will be described in detail with reference to the attached drawings such that the present invention can be put into practice by those skilled in the art. As those skilled in the art would realize, the described embodiments may be modified in various different ways, all without departing from the spirit or scope of the present invention. Like reference numerals designate like elements throughout the specification and the drawings.

The use of "may" when describing embodiments of the present invention refers to "one or more embodiments of the present invention." When a first element is described as being "coupled" or "connected" to a second element, the first element may be directly "coupled" or "connected" to the second element, or one or more other intervening elements may be located between the first element and the second element. Expressions such as "at least one of," when preceding a list of elements, modify the entire list of elements and do not modify the individual elements of the list.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Figure 2:
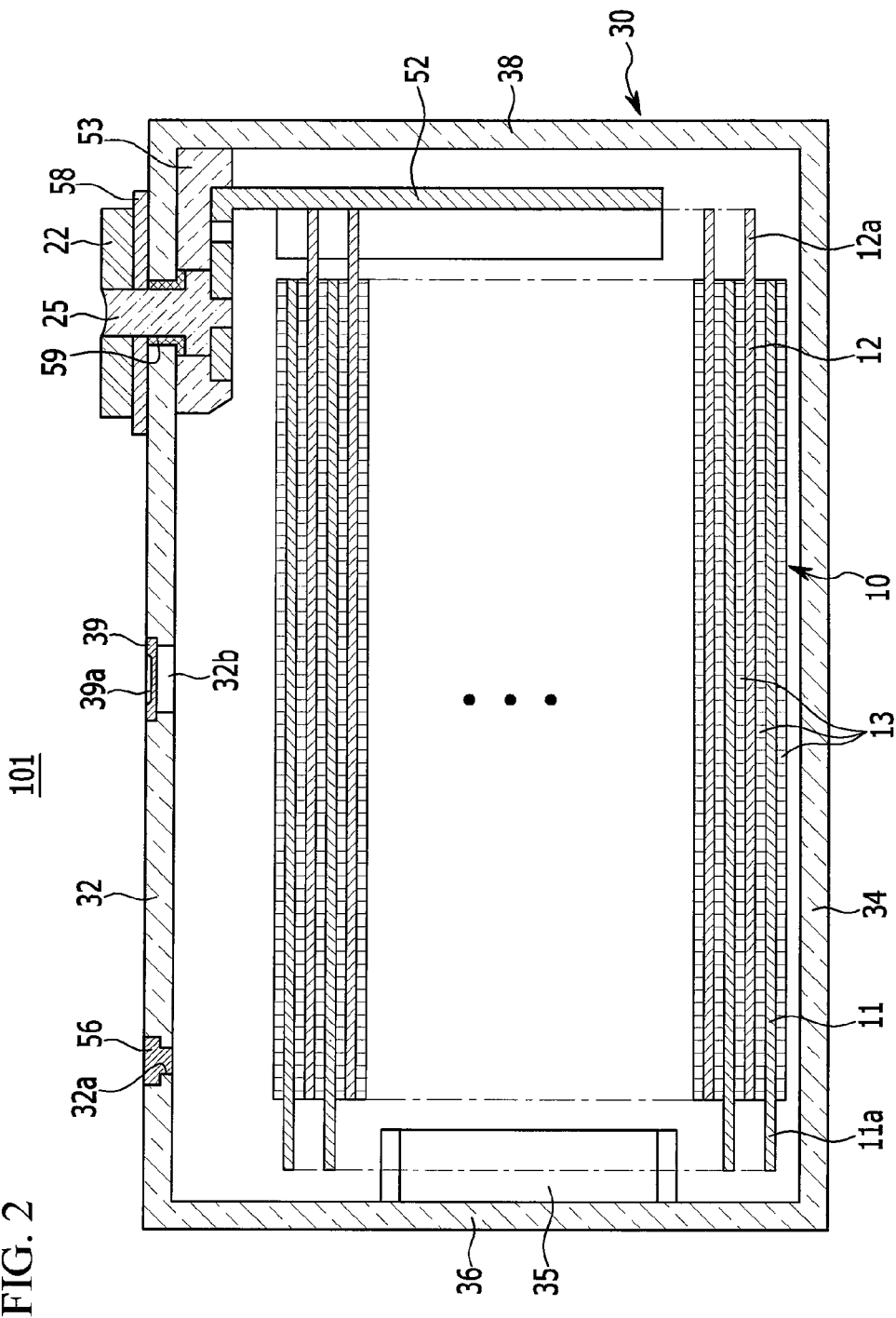
FIG. 2 is a cross-sectional view illustrating the rechargeable battery taken along the line II-II of FIG. 1.
Figure 3:
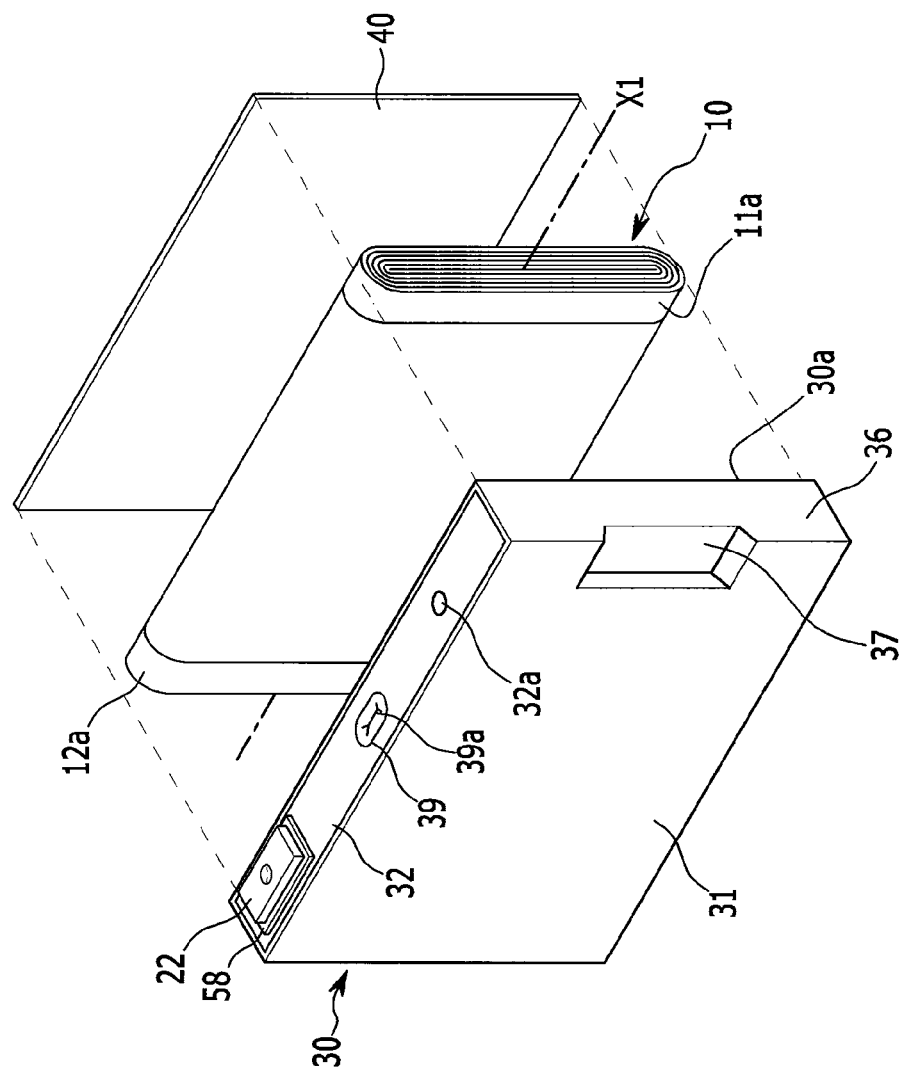
FIG. 3 is an exploded perspective view illustrating a rechargeable battery according to the first exemplary embodiment of the present invention.

FIG. 1 is a perspective view illustrating a rechargeable battery according to a first exemplary embodiment of the present invention, FIG. 2 is a cross-sectional view illustrating the rechargeable battery taken along the line II-II of FIG. 1, and FIG. 3 is an exploded perspective view illustrating a rechargeable battery according to the first exemplary embodiment of the present invention.

Referring to FIGS. 1, 2, and 3, a rechargeable battery 101 according to the first exemplary embodiment includes an electrode assembly 10 that is formed by spiral-winding a positive electrode (first electrode) 11 and a negative electrode (second electrode) 12 with a separator 13 interposed therebetween, a case 30 that houses the electrode assembly 10, and a cover 40 that is coupled to an opening 30a of the case 30.

The rechargeable battery 101 according to the present exemplary embodiment is a lithium ion rechargeable battery and has, for example, a rectangular shape (e.g., a square shape). However, the present invention is not limited thereto, and the present invention may be applied to a lithium polymer battery.

The positive electrode 11 and the negative electrode 12 include coated regions, which are areas in which an active material is coated in a current collector that is formed with a metal foil of a thin plate, and uncoated regions 11a and 12a, respectively, which are areas in which an active material is not coated. As shown in FIGS. 2 and 3, the positive electrode uncoated region 11a is formed at the side end of one side of the positive electrode 11 in a length direction of the positive electrode 11, and the negative electrode uncoated region 12a is formed at the opposite side end of the negative electrode 12 in a length direction of the negative electrode 12. The positive electrode 11 and the negative electrode 12 are spiral-wound about a winding axis X1 with the separator 13, which is an insulator, interposed therebetween.

Figure 4:
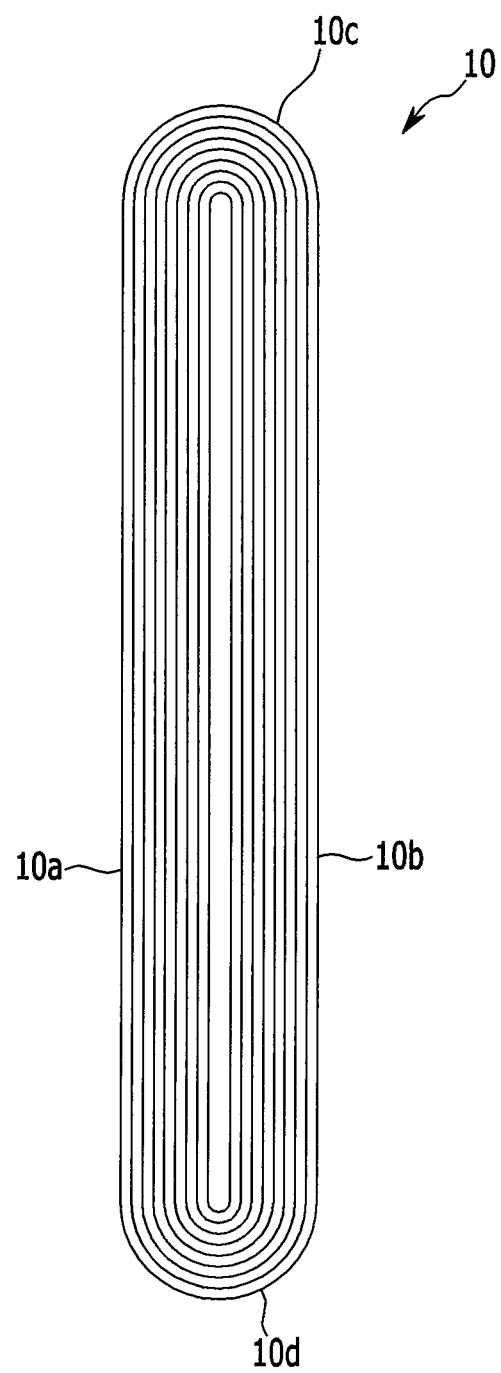
FIG. 4 is a cross-sectional view illustrating an electrode assembly according to the first exemplary embodiment of the present invention.

As shown in FIG. 4, the electrode assembly 10 has two side surfaces 10a and 10b that are flatly formed in an opposite direction and two curved surfaces 10c and 10d that connect the side surfaces 10a and 10b. One side surface 10a is disposed to face a bottom plate 31 of the case 30, and the other side surface 10b is disposed to face the cover 40. The bottom plate 31 of the case 30 and the cover 40 are disposed in parallel, and the side surfaces 10a and 10b are disposed in parallel to the cover 40 and the bottom plate 31 of the case 30. One curved surface 10c connects the upper end of the side surfaces 10a and 10c, and the other curved surface 10d connects the lower end of the side surfaces 10a and 10b. Accordingly, one curved surface 10c is located at an upper end portion of the electrode assembly 10, and the other curved surface 10d is located a lower end portion of the electrode assembly 10. The positive electrode uncoated region 11a is located at the side end of one side of the electrode assembly 10, and the negative electrode uncoated region 12a is located at the opposite side end of the electrode assembly 10.

The case 30 is formed as an approximate cuboid, and at one side, the opening 30a that is opened to face the bottom plate 31 of the case 30 is formed. The case 30 may be made of a metal such as aluminum or stainless steel.

The case 30 has a quadrangular-shaped bottom plate 31, and has a first side surface 32, a second side surface 34, a third side surface 36, and a fourth side surface 38 that protrude from the bottom plate 31. As used herein, side surfaces refer to sides or surfaces of the sides of the case 30. The first side surface 32 and the second side surface 34 are disposed to face the curved surfaces 10c and 10d of the electrode assembly 10, the third side surface 36 is disposed to face the positive electrode uncoated region 11a, and the fourth side surface 38 is disposed to face the negative electrode uncoated region 12a.

A protruded support jaw 35 is formed at the bottom plate 31 of the case 30, and the support jaw 35 contacts the bottom plate 31 and the third side surface 36. For example, FIG. 1 shows that the support jaw 35 protrudes from the bottom plate 31 toward the cover 40. The support jaw 35 is formed by bending the case 30, and a groove 37 is formed in the case 30 at an opposite surface of the support jaw 35. The support jaw 35 is disposed at or near the center of a length direction of the third side surface 36, and the positive electrode uncoated region 11a is bonded to the support jaw 35 by welding. Accordingly, the case 30 is charged as a positive electrode.

A terminal 22 that is electrically connected to the negative electrode 12 is installed at the first side surface 32, and the terminal 22 is electrically connected to the second electrode 12 through a current collecting member 52. The terminal 22 is formed with a rectangular plate shape, and is disposed in parallel to the first side surface 32. A connection pillar 25 is inserted in the terminal 22, and the connection pillar 25 is installed to penetrate the terminal 22 and the first side surface 32. The upper end of the connection pillar 25 is welded to the terminal 22, and the current collecting member 52 is welded to a lower portion of the connection pillar 25. The current collecting member 52 electrically connects the negative electrode uncoated region 12a and the connection pillar 25.

A sealing gasket 59 for sealing is inserted at the terminal 22 in a terminal opening (e.g., a terminal hole) that is formed in the first side surface 32. A lower insulating member 53 that supports the current collecting member 52 is installed in a lower portion of the first side surface 32. An upper insulating member 58 for electrical insulation is installed between the terminal 22 and the first side surface 32.

Further, an electrolyte injection opening 32a for injection of an electrolyte solution is formed at the first side surface 32, and a seal stopper 56 is installed at the electrolyte injection opening 32a. Further, a vent opening 32b (e.g., a vent hole) is formed at the first side surface 32, and a vent plate 39 in which a notch 39a is formed to open at a reference pressure (e.g., a predetermined pressure) is installed at the vent hole 32b.

The cover 40 is formed in a quadrangular plate shape and is bonded to the opening 30a of the case 30 by welding to close and seal the case 30. The cover 40 may be made of a metal such as aluminum, and is disposed in parallel to the side surfaces 10a and 10b of the electrode assembly 10.

In this way, according to the present exemplary embodiment, by contacting or pressing the side surface 10a or 10b of the electrode assembly 10, the cover 40 can reduce a gap between electrodes. Further, because the electrode assembly is inserted into a side of the case having a wide surface, the electrode assembly can be easily inserted into the case.

In addition, because a distance between the opening 30a and the bottom plate 31 of the case 30 is relatively small, the case 30 may be produced by sheet metal processing. Accordingly, compared with production by a drawing or punching processing, the case can be easily produced and a thickness of the case can be reduced.

Figure 5:
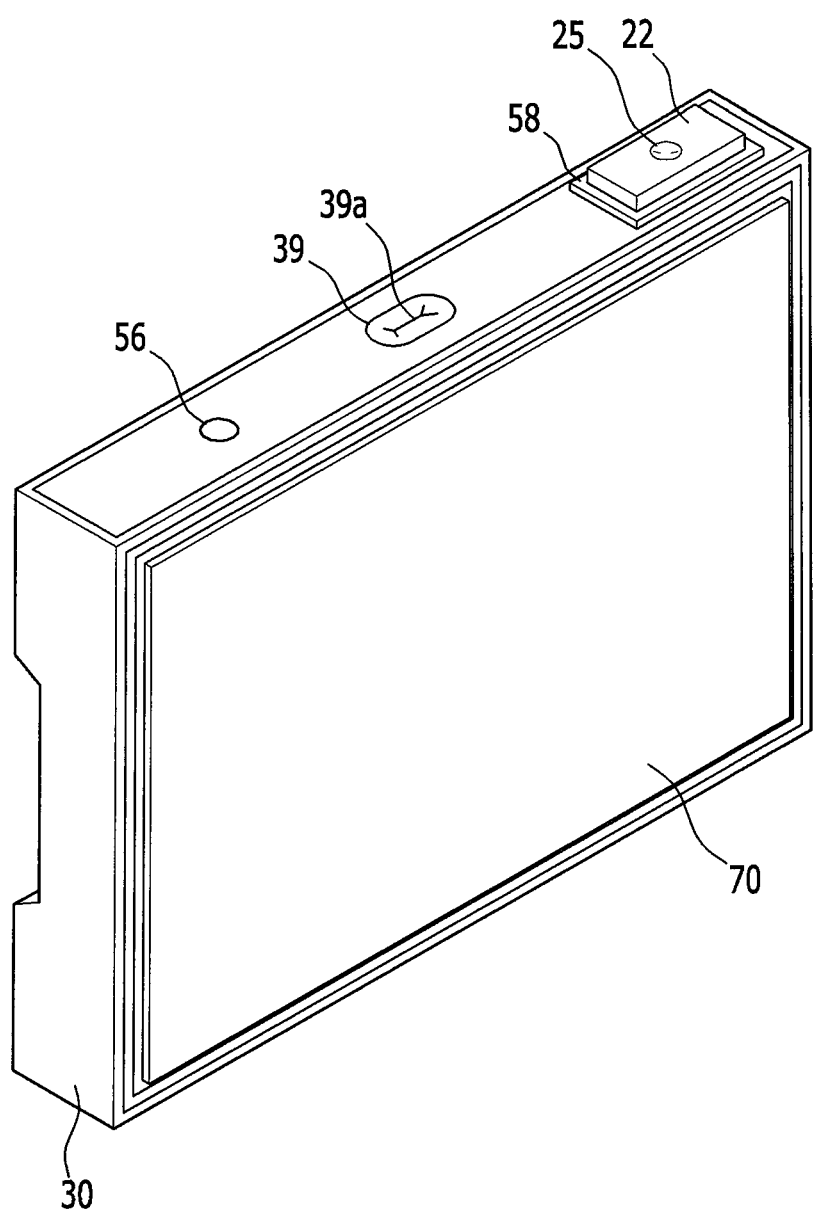
FIG. 5 is a perspective view illustrating a rechargeable battery according to a second exemplary embodiment of the present invention.
Figure 6:
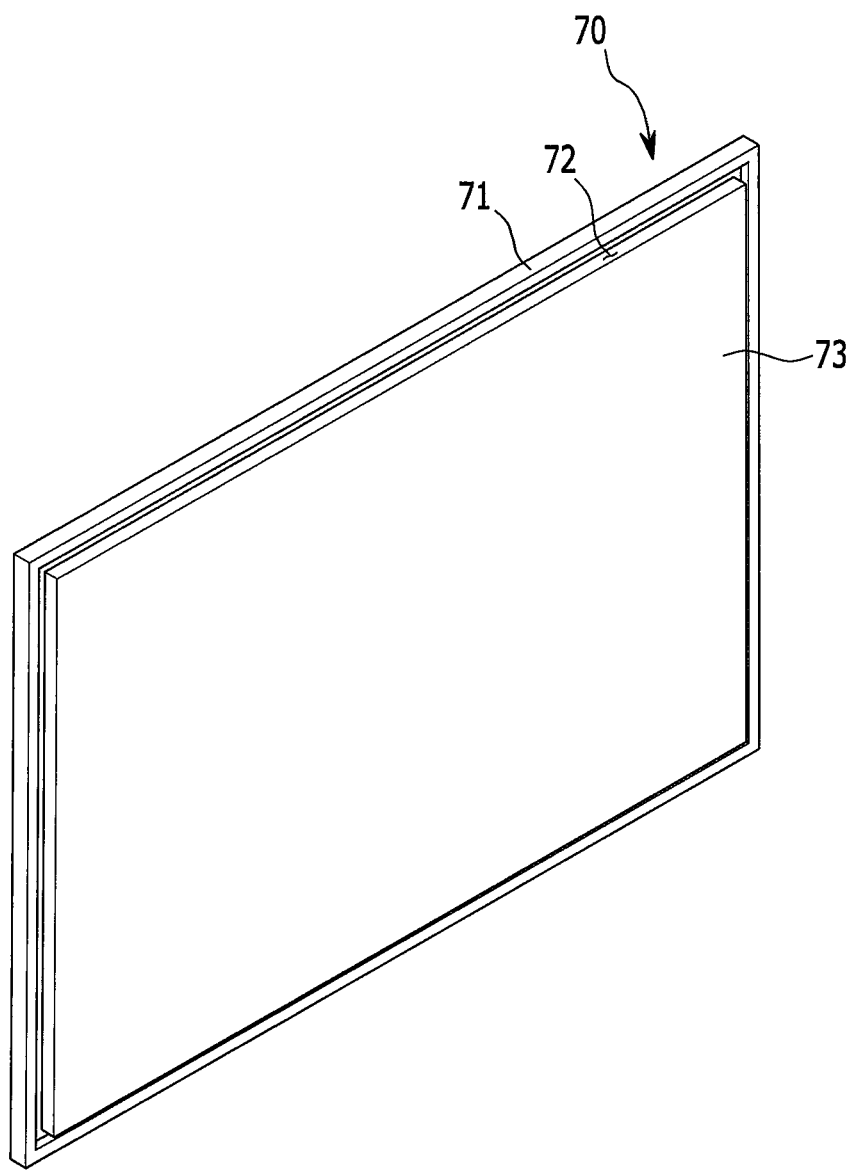
FIG. 6 is a perspective view illustrating a cover of a rechargeable battery according to the second exemplary embodiment of the present invention.
Figure 7:
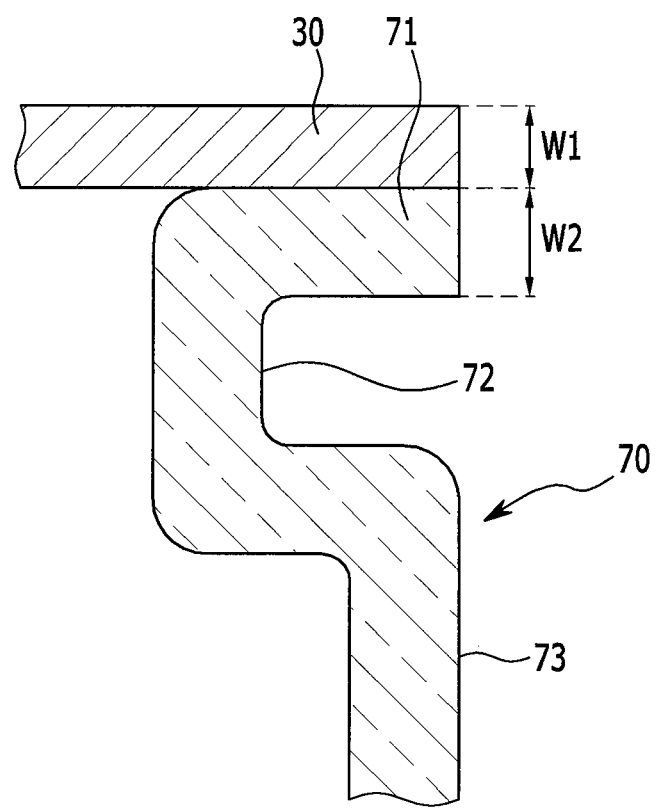
FIG. 7 is a cross-sectional view illustrating a case and a cover in a coupled state according to the second exemplary embodiment of the present invention.

FIG. 5 is a perspective view illustrating a rechargeable battery according to a second exemplary embodiment of the present invention, FIG. 6 is a perspective view illustrating a cover of a rechargeable battery according to the second exemplary embodiment of the present invention, and FIG. 7 is a cross-sectional view illustrating a case and a cover of a coupled state according to the second exemplary embodiment of the present invention.

Referring to FIGS. 5, 6, and 7, a rechargeable battery 102 according to the second exemplary embodiment is formed with the same structure as that of the rechargeable battery according to the first exemplary embodiment, except for a structure of a cover 70, and thus a description of the same structure will be omitted.

The cover 70 is formed in a quadrangular plate shape, and is bonded to the opening 30a of the case 30 by welding to close and seal the case 30. The cover 70 may be made of a metal such as aluminum, and is disposed in parallel to the side surfaces 10a and 10b of the electrode assembly 10.

A flange 71 that is bent in parallel to the side surfaces 32, 34, 36, 38 of the case 30 extends from side ends of the cover 70, and end portions of the flange 71 and side surface end portions of the case 30 are bonded by welding.

The flange 71 is connected along the side ends (e.g., around the periphery) of the cover 70, and protrudes in a direction toward an opening in the bottom plate 31. A support groove 72 that is bent in the flange 71 is formed in the cover 70, and the support groove 72 connects the flange 71 and a support surface 73 that is formed at the inside of the flange 71. The support surface 73 is enclosed by the support groove 72 and is formed in a flat plate form.

A thickness W1 of the case 30 is formed smaller than a thickness W2 of the cover 70, and is 0.5 times to 0.8 times the thickness W2 of the cover 70.

As described above, when the flange 71 is formed, strength of the cover 70 is improved, and particularly, when side surfaces of the flange 71 and the case 30 are disposed in parallel, a bonding force of the case 30 and the cover 70 can be prevented from being deteriorated by an external impact or vibration.

Figure 8:
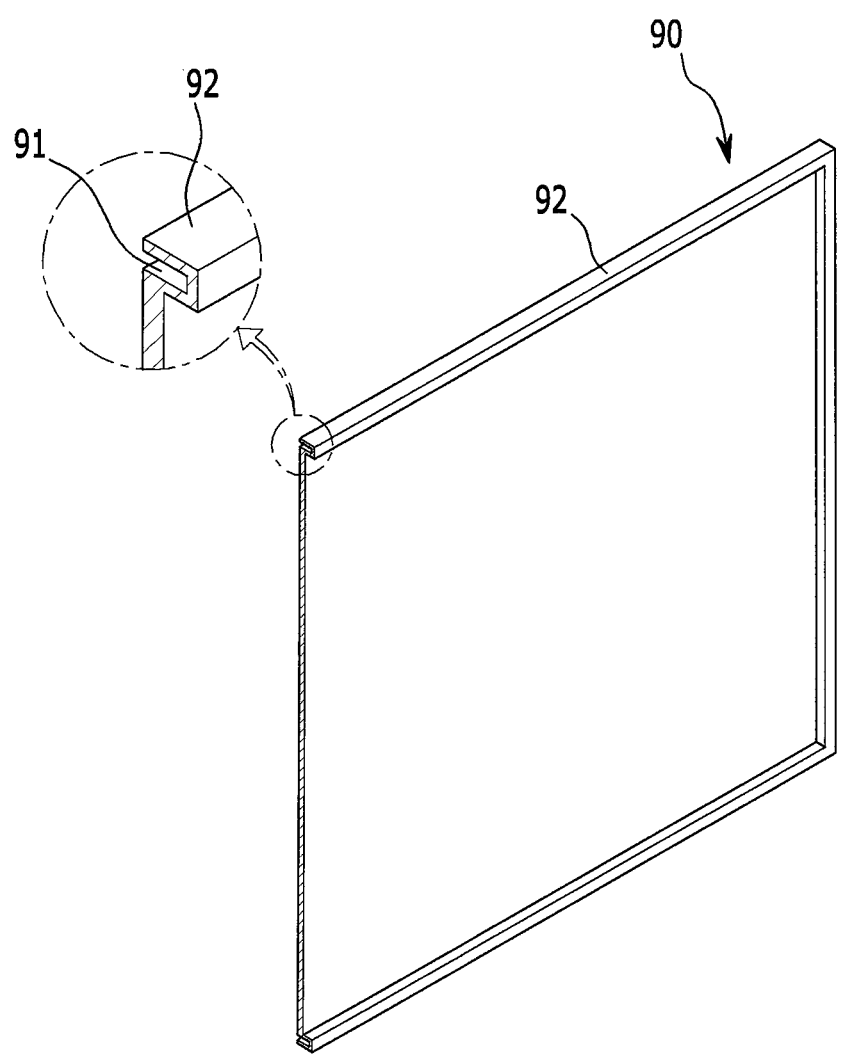
FIG. 8 is a perspective view illustrating a cover of a rechargeable battery according to a third exemplary embodiment of the present invention.
Figure 9:
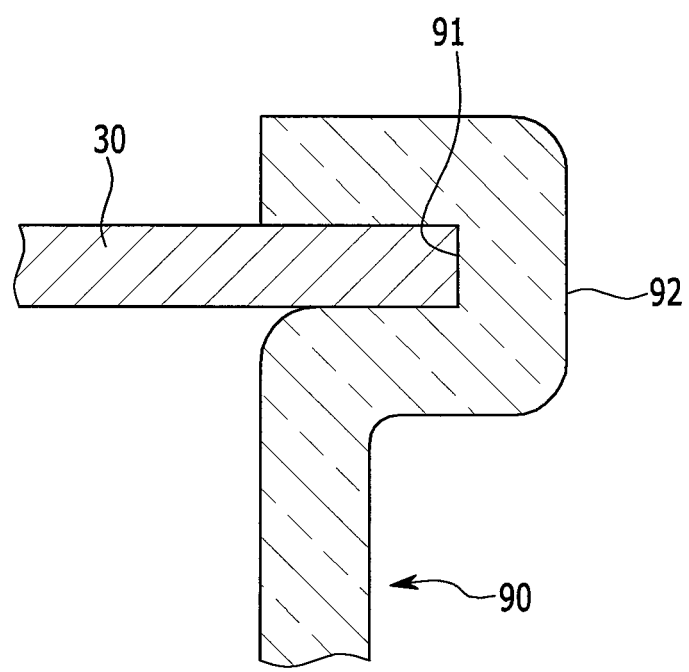
FIG. 9 is a cross-sectional view illustrating a case and a cover in a coupled state according to the third exemplary embodiment of the present invention.

FIG. 8 is a perspective view illustrating a cover of a rechargeable battery according to a third exemplary embodiment of the present invention, and FIG. 9 is a cross-sectional view illustrating a case and a cover of a coupled state according to the third exemplary embodiment of the present invention.

Referring to FIGS. 8 and 9, a rechargeable battery according to the third exemplary embodiment is formed with the same structure as that of a rechargeable battery according to the first exemplary embodiment, except for a structure of a cover. A description of the same structure will be omitted.

A cover 90 is formed in a quadrangular plate shape, and is bonded to the opening 30a of the case 30 by welding to close and seal the case 30. The cover 90 may be made of a metal such as aluminum, and is disposed in parallel to the side surfaces 10a and 10b of the electrode assembly 10.

At the side end of the cover 90, a welding groove 91 in which side surface end portions of the case 30 are inserted is formed, and a protruding portion 92 is formed at the opposite side of the welding groove 91. The cover 90 and the case 30 are welded in a state in which the side ends of the case 30 are inserted into the welding groove 91. As in the present exemplary embodiment, when the cover 90 has the side surface end portions of the case 30 inserted thereto, a bonding force of the case 30 and the cover 90 is further improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SOME OF THE REFERENCE SYMBOLS

| | |
|---|---|
| 101, 102: rechargeable battery | 10: electrode assembly |
| 10a, 10b: side surface | 10c, 10d: curved surface |
| 11: positive electrode | 11a: positive electrode uncoated region |
| 12: negative electrode | 12a: negative electrode uncoated region |
| 22: terminal | 25: connection pillar |
| 30: case | 30a: opening |
| 31: bottom plate | 32: first side surface |
| 34: second side surface | 36: third side surface |
| 38: fourth side surface | 39: vent plate |
| 35: support jaw | 37: groove |
| 32a: electrolyte injection opening | 32b: vent hole |
| 40, 70, 90: cover | 52: current collecting member |
| 53: lower insulating member | 56: seal stopper |
| 59: sealing gasket | 71: flange |
| 72: support groove | 73: support surface |
| 91: welding groove | 92: protruding portion |

What is claimed is:

1. A rechargeable battery comprising:
an electrode assembly comprising a first electrode and a second electrode, the electrode assembly being spirally-wound;
a case has an opening into which the electrode assembly is inserted;
a cover coupled to the case at the opening, the cover being at least partly inside the case through the opening; and
a terminal electrically connected to the second electrode, the terminal extending to the outside of the case,
wherein the electrode assembly comprises two side surfaces facing opposite directions and two curved surfaces that connect the two side surfaces, and a surface of the cover faces a first side surface of the two side surfaces.

2. The rechargeable battery of claim 1, wherein the case comprises a bottom plate and four sides that extend from the bottom plate, and
the bottom plate is parallel to a second side surface of the two side surfaces of the electrode assembly, and the cover is parallel to the first side surface of the electrode assembly.

3. The rechargeable battery of claim 2, wherein the electrode assembly further comprises two side ends comprising a first electrode uncoated region and a second electrode uncoated region in which an active material is not coated, and wherein, at the bottom plate of the case, the case comprises a support jaw welded to the first electrode uncoated region.

4. The rechargeable battery of claim 3, wherein the bottom plate has a quadrangular shape, and the four sides comprise a first side, a second side, a third side, and a fourth side that each extend from the bottom plate,
wherein the first side and the second side respectively face the two curved surfaces of the electrode assembly, the third side faces the first electrode uncoated region, and the fourth side faces the second electrode uncoated region.

5. The rechargeable battery of claim 4, wherein the support jaw contacts the bottom plate and the third side of the case.

6. The rechargeable battery of claim 5, wherein a groove is at an opposite surface of the support jaw in the case.

7. The rechargeable battery of claim 1, wherein the cover comprises a flange bent parallel to a side of the case at a side end of the cover, and an end portion of the flange and a side end portion of the case are welded together.

8. The rechargeable battery of claim 7, wherein the flange is connected along the side end of the cover.

9. The rechargeable battery of claim 8, wherein the cover comprises a support groove bent from the flange and connected to the flange.

10. The rechargeable battery of claim 1, wherein the cover comprises a welding groove into which a side end portion of the case is inserted, and the cover is welded to the case with the side end portion of the case inserted into the welding groove.

11. The rechargeable battery of claim 1, wherein a thickness of the case is 0.5 times to 0.8 times that of the cover.

12. A rechargeable battery comprising:
an electrode assembly comprising a first electrode and a second electrode, the electrode assembly being spirally-wound;
a case has an opening into which the electrode assembly is inserted;
a cover coupled to the case at the opening; and
a terminal electrically connected to the second electrode, the terminal extending to the outside of the case,
wherein the electrode assembly comprises two side surfaces facing opposite directions and two curved surfaces that connect the two side surfaces, and a surface of the cover faces a first side surface of the two side surfaces;
wherein the case comprises a bottom plate and four sides that extend from the bottom plate, and the bottom plate is parallel to a second side surface of the two side surfaces of the electrode assembly, and the cover is parallel to the first side surface of the electrode assembly; and
wherein the electrode assembly further comprises two side ends comprising a first electrode uncoated region and a second electrode uncoated region in which an active material is not coated, and wherein, at the bottom plate of the case, the case comprises a support jaw welded to the first electrode uncoated region and electrically connected to the case.

13. A rechargeable battery comprising:
an electrode assembly comprising a first electrode and a second electrode, the electrode assembly being spirally-wound;
a case having a bottom plate, four sides that extend from the bottom plate, and an opening into which the electrode assembly is inserted;
a cover coupled to the case at the opening, the cover comprising a flange; and
a terminal electrically connected to the second electrode, the terminal extending to the outside of the case,
wherein the electrode assembly comprises two side surfaces facing opposite directions and two curved surfaces that connect the two side surfaces, and a surface of the cover faces a first side surface of the two side surfaces, and wherein the flange extends towards the bottom plate and parallel to a portion of one of the four sides of the case that extends away from the bottom plate.

* * * * *